United States Patent
Bai et al.

(10) Patent No.: US 10,981,578 B2
(45) Date of Patent: *Apr. 20, 2021

(54) SYSTEM AND METHOD FOR HARDWARE VERIFICATION IN AN AUTOMOTIVE VEHICLE

(71) Applicant: GM GLOBAL TECHNOLOGY OPERATIONS LLC, Detroit, MI (US)

(72) Inventors: Berlinda Q. Bai, Troy, MI (US); Dean C. Degazio, Birmingham, MI (US); Esayas Naizghi, Warren, MI (US); Gurmitsingh M. Banvait, Novi, MI (US); Sidharth Nakra, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 246 days.

This patent is subject to a terminal disclaimer.

(21) Appl. No.: 16/052,803

(22) Filed: Aug. 2, 2018

(65) Prior Publication Data

US 2020/0039533 A1 Feb. 6, 2020

(51) Int. Cl.
*B60W 50/04* (2006.01)
*G07C 5/08* (2006.01)
(Continued)

(52) U.S. Cl.
CPC .......... *B60W 50/045* (2013.01); *B60W 10/04* (2013.01); *B60W 10/18* (2013.01);
(Continued)

(58) Field of Classification Search
CPC .... B60W 50/045; B60W 10/04; B60W 10/20; B60W 10/18; B60W 2556/00;
(Continued)

(56) References Cited

U.S. PATENT DOCUMENTS 8,000,855 B2 * 8/2011 Bauerle .............. G05B 23/0237
701/33.6
8,442,793 B2 * 5/2013 Goodwin ............... G01D 5/145
702/116
(Continued)

FOREIGN PATENT DOCUMENTS

CN 102749583 A * 10/2012
CN 104737134 A * 6/2015 ............ G06F 11/263
(Continued)

*Primary Examiner* — Behrang Badii
*Assistant Examiner* — Jalal C Coduroglu

(57) ABSTRACT

An automotive vehicle includes at least one sensor configured to detect features in a region proximate the exterior of the vehicle, at least one actuator configured to control vehicle steering, propulsion, shifting, or braking, and an automated driving system selectively operable in a nominal mode and in a degraded mode. The automated driving system is configured to generate an actuator control signal for the at least one actuator in response to sensor signals from the at least one sensor. The automated driving system includes a computational accelerator processor. The vehicle further includes a monitor processor in communication with the automated driving system. The monitor processor is configured to provide a test input for processing by the computational accelerator processor, receive a test output from the computational accelerator processor, and in response to the test output not satisfying a validation criterion, control the automated driving system in the degraded mode.

15 Claims, 4 Drawing Sheets

(51) Int. Cl.
*B60W 10/04* (2006.01)
*B60W 10/20* (2006.01)
*B60W 10/18* (2012.01)
*G05D 1/00* (2006.01)
*B60W 50/00* (2006.01)

(52) U.S. Cl.
CPC ........... *B60W 10/20* (2013.01); *G05D 1/0088* (2013.01); *G07C 5/0808* (2013.01); *B60W 2050/0002* (2013.01); *B60W 2050/046* (2013.01); *B60W 2420/42* (2013.01); *B60W 2420/52* (2013.01); *B60W 2510/18* (2013.01); *B60W 2510/20* (2013.01); *B60W 2556/00* (2020.02)

(58) Field of Classification Search
CPC ..... B60W 2420/52; B60W 2050/0002; B60W 2510/18; B60W 2510/20; B60W 2420/42; B60W 2050/046; G07C 5/0808; G05D 1/0088
See application file for complete search history.

(56) References Cited

U.S. PATENT DOCUMENTS

| | | | | |
|---|---|---|---|---|
| 8,832,502 | B2* | 9/2014 | Dusanapudi | G06F 11/263 714/33 |
| 9,522,671 | B2* | 12/2016 | Trippel | B60W 20/40 |
| 9,594,075 | B2* | 3/2017 | Eggan | G01N 21/6486 |
| 9,933,786 | B2* | 4/2018 | Sundaram | B60W 10/06 |
| 9,944,282 | B1* | 4/2018 | Fields | G05D 1/0055 |
| 9,946,531 | B1* | 4/2018 | Fields | G07C 5/0808 |
| 9,954,851 | B2* | 4/2018 | Ahn | H04L 63/0823 |
| 10,007,263 | B1* | 6/2018 | Fields | G05D 1/0055 |
| 10,214,163 | B2* | 2/2019 | Grimm | B60R 16/023 |
| 10,383,059 | B2* | 8/2019 | Lei | H04W 52/0241 |
| 10,394,241 | B2* | 8/2019 | Debouk | G05D 1/0088 |
| 10,399,600 | B2* | 9/2019 | Adams | B62D 15/025 |
| 10,558,539 | B2* | 2/2020 | Wang | G06F 11/0739 |
| 10,672,206 | B2* | 6/2020 | Mehdizade | G07C 5/008 |
| 2008/0046603 | A1* | 2/2008 | Kobayashi | G06F 11/364 710/17 |
| 2009/0226057 | A1* | 9/2009 | Mashiach | G06T 5/002 382/128 |
| 2015/0239086 | A1* | 8/2015 | Lee | B23Q 11/06 83/58 |
| 2015/0341862 | A1* | 11/2015 | Lei | H04W 52/0241 370/311 |
| 2016/0057043 | A1* | 2/2016 | Osborne | H04L 43/10 370/248 |
| 2016/0140429 | A1* | 5/2016 | Glosser | G05B 23/0272 702/185 |
| 2017/0351251 | A1* | 12/2017 | Eeckhout | G05B 23/0283 |
| 2018/0050692 | A1* | 2/2018 | Kim | G05D 1/0212 |
| 2018/0329419 | A1* | 11/2018 | Adams | B62D 15/025 |
| 2018/0364712 | A1* | 12/2018 | Debouk | G05D 1/0088 |
| 2019/0016329 | A1* | 1/2019 | Park | B60K 6/32 |
| 2019/0095302 | A1* | 3/2019 | Wang | G06F 11/0739 |
| 2019/0180526 | A1* | 6/2019 | Mehdizade | G07C 5/085 |
| 2020/0039533 | A1* | 2/2020 | Bai | B60W 10/18 |
| 2020/0050481 | A1* | 2/2020 | Ouyang | G06F 9/4881 |

FOREIGN PATENT DOCUMENTS

| | | | | |
|---|---|---|---|---|
| CN | 105511448 A | * | 4/2016 | |
| CN | 107454391 A | * | 12/2017 | ......... G05B 23/0283 |
| EP | 2937554 A1 | * | 10/2015 | ........... B60W 20/50 |
| JP | 2003345852 A | * | 12/2003 | |
| JP | 2011053805 A | * | 3/2011 | |
| KR | 20110059695 A | * | 6/2011 | |
| KR | 20140085133 A | * | 7/2014 | |
| KR | 101602069 B1 | * | 3/2016 | |
| WO | WO-2009109971 A2 | * | 9/2009 | ............ G06T 7/187 |
| WO | WO-2015120792 A1 | * | 8/2015 | .............. A61P 43/00 |
| WO | WO-2015164367 A1 | * | 10/2015 | ........ G01N 33/5058 |
| WO | WO-2016102645 A1 | * | 6/2016 | ......... G05B 23/0283 |
| WO | WO-2018011021 A1 | * | 1/2018 | ............ B60T 17/226 |
| WO | WO-2018011999 A1 | * | 1/2018 | ............ H04L 67/12 |

* cited by examiner

SYSTEM AND METHOD FOR HARDWARE VERIFICATION IN AN AUTOMOTIVE VEHICLE

TECHNICAL FIELD

The present disclosure relates to vehicles controlled by automated driving systems, particularly those configured to automatically control vehicle steering, propulsion, and braking during a drive cycle without human intervention.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

An automotive vehicle according to the present disclosure includes at least one sensor configured to detect features in a region proximate the exterior of the vehicle. The vehicle also includes at least one actuator configured to control vehicle steering, propulsion, shifting, or braking. The vehicle additionally includes an automated driving system selectively operable in a nominal mode and in a degraded mode. The automated driving system is configured to generate an actuator control signal for the at least one actuator in response to sensor signals from the at least one sensor. The automated driving system includes a computational accelerator processor. The vehicle further includes a monitor processor in communication with the automated driving system. The monitor processor is configured to provide a test input for processing by the computational accelerator processor, receive a test output from the computational accelerator processor, and in response to the test output not satisfying a validation criterion, control the automated driving system in the degraded mode.

In an exemplary embodiment, the computational accelerator processor comprises a plurality of parallel processing cores, and the test input is configured to utilize a threshold number of the plurality of parallel processing cores.

In an exemplary embodiment, the test input comprises an image frame, video segment, or LiDAR point cloud.

In an exemplary embodiment, the monitor processor is further configured to provide the test input in response to a resource utilization criterion being satisfied. In such embodiments, the resource utilization criterion may be satisfied in response to the vehicle being shifted into PARK.

In an exemplary embodiment, the monitor processor defines a CPU of the automated driving system.

In an exemplary embodiment, the automated driving system comprises a primary control processor, with the primary control processor being distinct from the monitor processor.

A method of validating a computational accelerator processor according to an embodiment of the present disclosure includes defining a reference set of components for validation. The reference set of components includes a reference computational accelerator processor with a plurality of parallel processing cores. The method also includes defining a test pattern. The method additionally includes processing the test pattern via the reference set of components to obtain a reference output. The method further includes measuring a number of the plurality of parallel processing cores utilized by the processing the test pattern. The method additionally includes, in response to the number of the plurality of parallel processing cores utilized by the processing the test pattern satisfying a predefined threshold, storing the test pattern and a validation criterion associated with the reference output in non-transient data memory. The non-transient data memory is in communication with a monitor processor. The monitor processor is in communication with a target set of components including a target computational accelerator processor. The target set of components is selectively operable in a nominal mode and in a degraded mode. The method further includes providing the test pattern, via the monitor processor, to the target set of components. The method additionally includes processing the test pattern via the target set of components to obtain a test output. The method further includes, in response to the test output not satisfying the validation criterion, automatically controlling the target set of components in the degraded mode.

In an exemplary embodiment, the target set of components defines at least a portion of an automated driving system of an automotive vehicle.

In an exemplary embodiment, the test pattern includes an image frame, video segment, or LiDAR point cloud.

In an exemplary embodiment, the providing the test pattern to the target set of components is in response to a resource utilization criterion being satisfied. In such embodiments, the target set of components may define at least a portion of an automated driving system of an automotive vehicle, and the resource utilization criterion may be satisfied in response to the vehicle being shifted into PARK.

In an exemplary embodiment, the method additionally includes, in response to the number of the plurality of parallel processing cores utilized by the processing the test pattern not satisfying the predefined threshold, redefining the test pattern.

In an exemplary embodiment, the predefined threshold corresponds to substantially all of the plurality of parallel processing cores.

In an exemplary embodiment, the validation criterion includes an execution time or a throughput time.

Embodiments according to the present disclosure provide a number of advantages. For example, the present disclosure provides a system and method for testing hardware in an automotive vehicle, including massively parallel processors for which known diagnostic methods are unsuitable.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
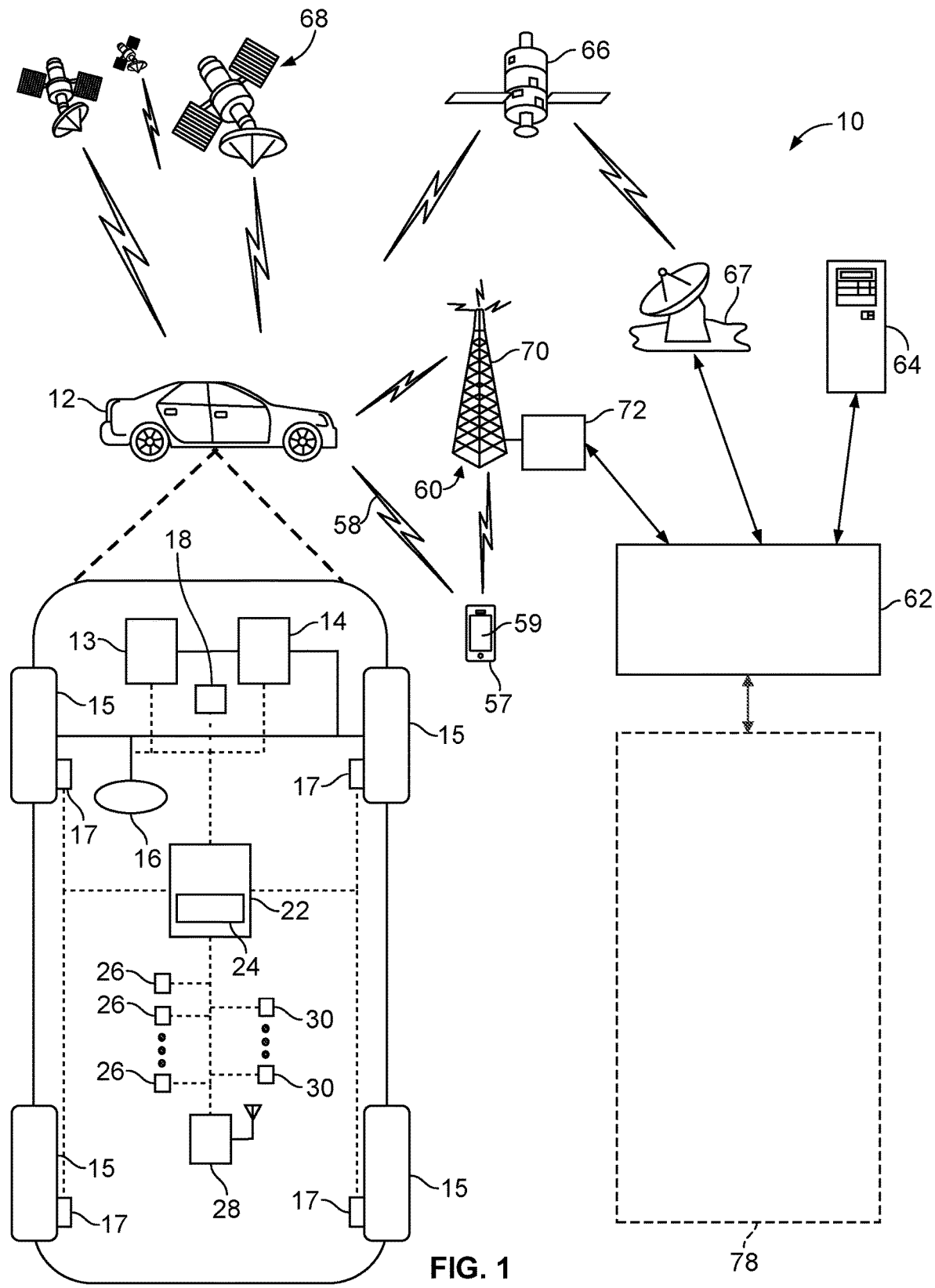
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a mobile device 57 such as a smart phone, and a remote access center 78.

The vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The vehicle 12 includes a propulsion system 13, which may in various embodiments include an internal combustion engine, an electric machine such as a traction motor, and/or a fuel cell propulsion system.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of a control system 22. While depicted as a single unit for illustrative purposes, the control system 22 may include a plurality of discrete controllers. The control system 22 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the control system 22 in controlling the vehicle.

The control system 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle propulsion, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the mobile device 57. The mobile device 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving GPS satellite signals and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12. The computer 64 may be in communication with at least one supplemental vehicle in addition to the vehicle 12. The vehicle 12 and any supplemental vehicles may be collectively referred to as a fleet.

Figure 2:
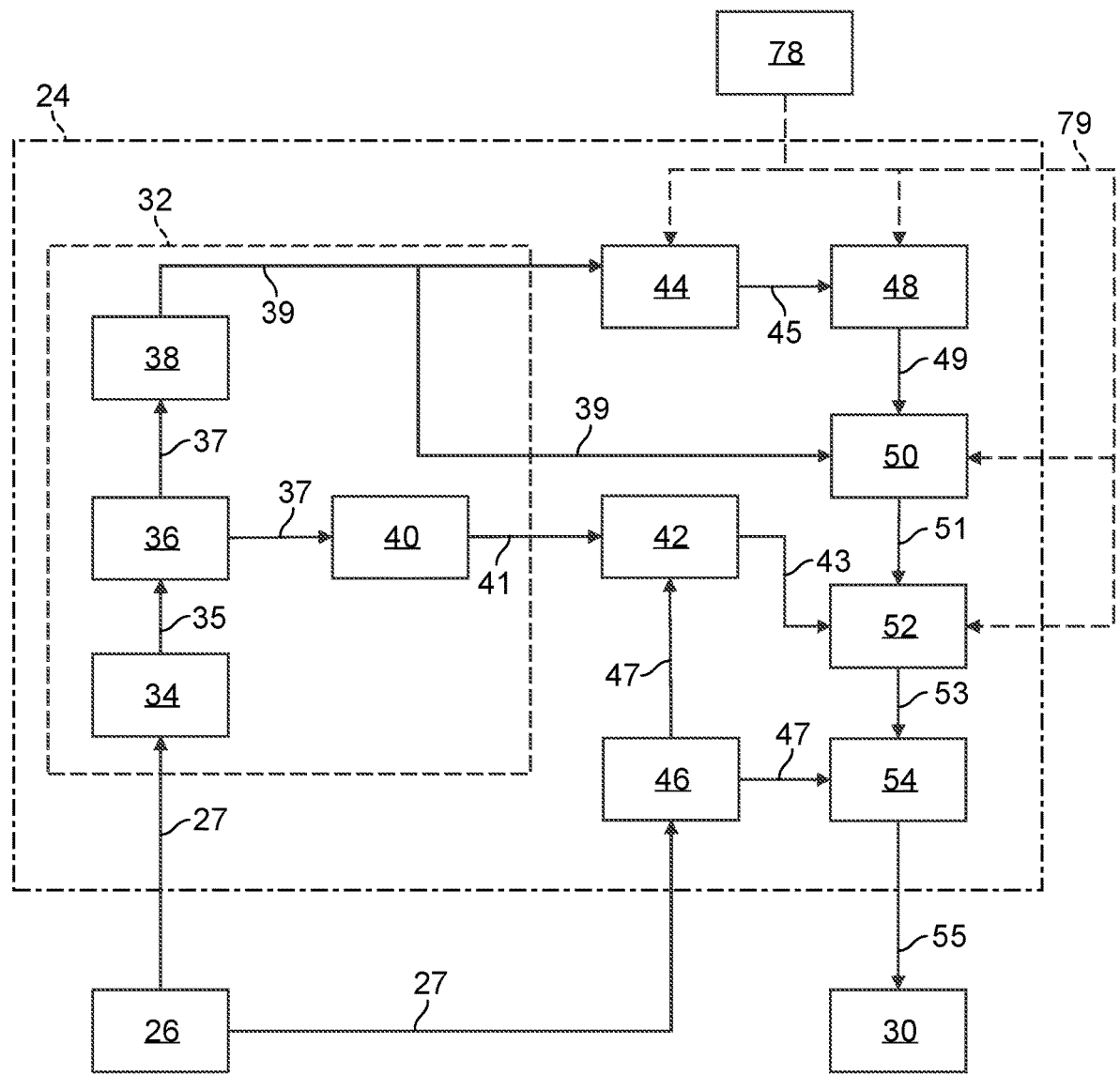
FIG. 2 is a schematic block diagram of an automated driving system (ADS) for a vehicle according to an embodiment of the present disclosure.

As shown in FIG. 2, the ADS 24 includes multiple distinct control modules, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

Figure 3:
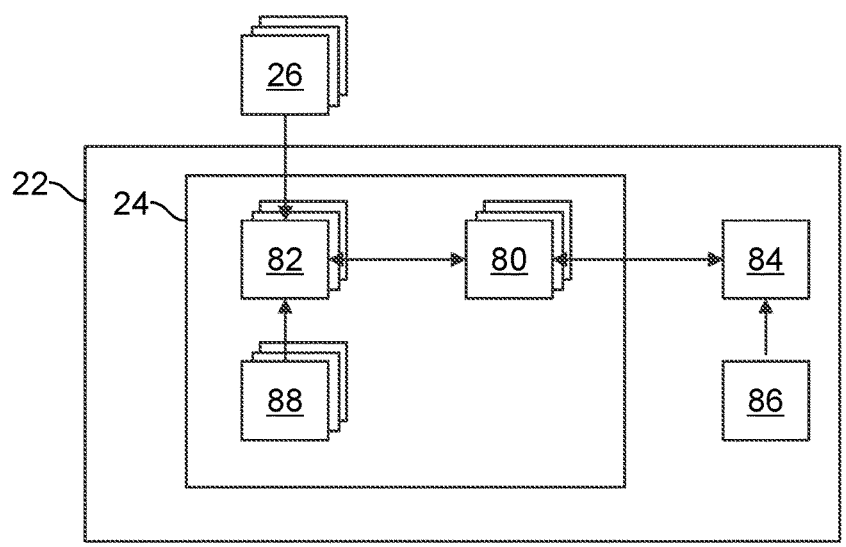
FIG. 3 is a schematic representation of a control system according to an embodiment of the present disclosure.

Referring now to FIG. 3, an aspect of the control system 22 is illustrated in further detail. In this embodiment, the automated driving system 24 includes a CPU 80 in communication with a computational accelerator processor 82, which may alternatively be referred to as an accelerator. While only one CPU 80 and one accelerator 82 are discussed below for illustrative purposes, the ADS 24 may include additional CPUs 80 and/or accelerators 82, as illustrated, to provide redundancy.

A computational accelerator processor refers to the category of processors configured for massively parallel computing, such as graphical processing units (GPUs), vector processors, or field-programmable gate arrays (FPGAs). Whereas traditional CPUs are provided with a relatively small number of processor cores optimized for sequential serial processing, computational accelerator processors include a much larger number of smaller, more efficient cores optimized for performing multiple simpler calculations in parallel. Computational accelerator processors may therefore be well suited to perform complex statistical computations of the type used in image recognition.

In the illustrated embodiment, the accelerator 82 is configured to perform one or more functions of the perception system 32 under the control of the CPU 80. The accelerator 82 receives data from the sensors 26 and from the CPU 80, determines attributes of objects sensed by the sensors 26, and communicates the object attributes to the CPU 80 for subsequent processing, e.g. object identification.

Due to the massively parallel nature of computational accelerator processors, complex calculations are generally broken into many discrete simple calculations, which are then assigned to separate processor cores, or pipes, according to resource availability. Computational accelerator processors may therefore resemble black boxes, in that it may be challenging to trace the results of any individual calculation step between the input to the accelerator and the output therefrom. Conventional hardware verification methods are therefore not well suited for evaluating performance of computational accelerator processors.

The control system 22 is provided with a monitor processor 84. In the illustrated embodiment, the monitor processor 84 is provided as a distinct hardware unit from those forming the ADS 24, e.g. a microprocessor or CPU discrete from the CPU 80 and accelerator 82. In an exemplary embodiment, the monitor processor 84 is a high integrity processor with self-diagnosis capability, e.g. generally similar to conventional automotive electronic control units. The monitor processor 84 is in communication with the CPU 80 and with a first computer-readable storage device 86. The accelerator 82 is in communication with a second computer-readable storage device 88. In other embodiments, the functions of the monitor processor 84 described below may be performed by the CPU 80 or other processor of the automated driving system 24, such that no discrete processor is provided.

The second computer-readable storage device 88 is provided with a plurality of test patterns. Each respective test pattern is representative of raw data as could be captured by the sensors 26, e.g. an image frame, a video segment comprising a plurality of images, a LiDAR point cloud, or any other representative data. A method of defining test patterns will be discussed below with respect to FIG. 5. The data in each test pattern indicates the presence of one or more objects of a type which the ADS 24 is capable of classifying, such as a car, a pedestrian, a bicycle, or an item of road furniture. Furthermore, the computer-readable storage device is provided with a reference number associated with each respective test pattern. The first computer-readable storage device 86 is likewise provided with the reference numbers of the test patterns, and furthermore with an identification tag for each test pattern. The identification tags indicate which type of object is present in each test pattern.

Figure 4:
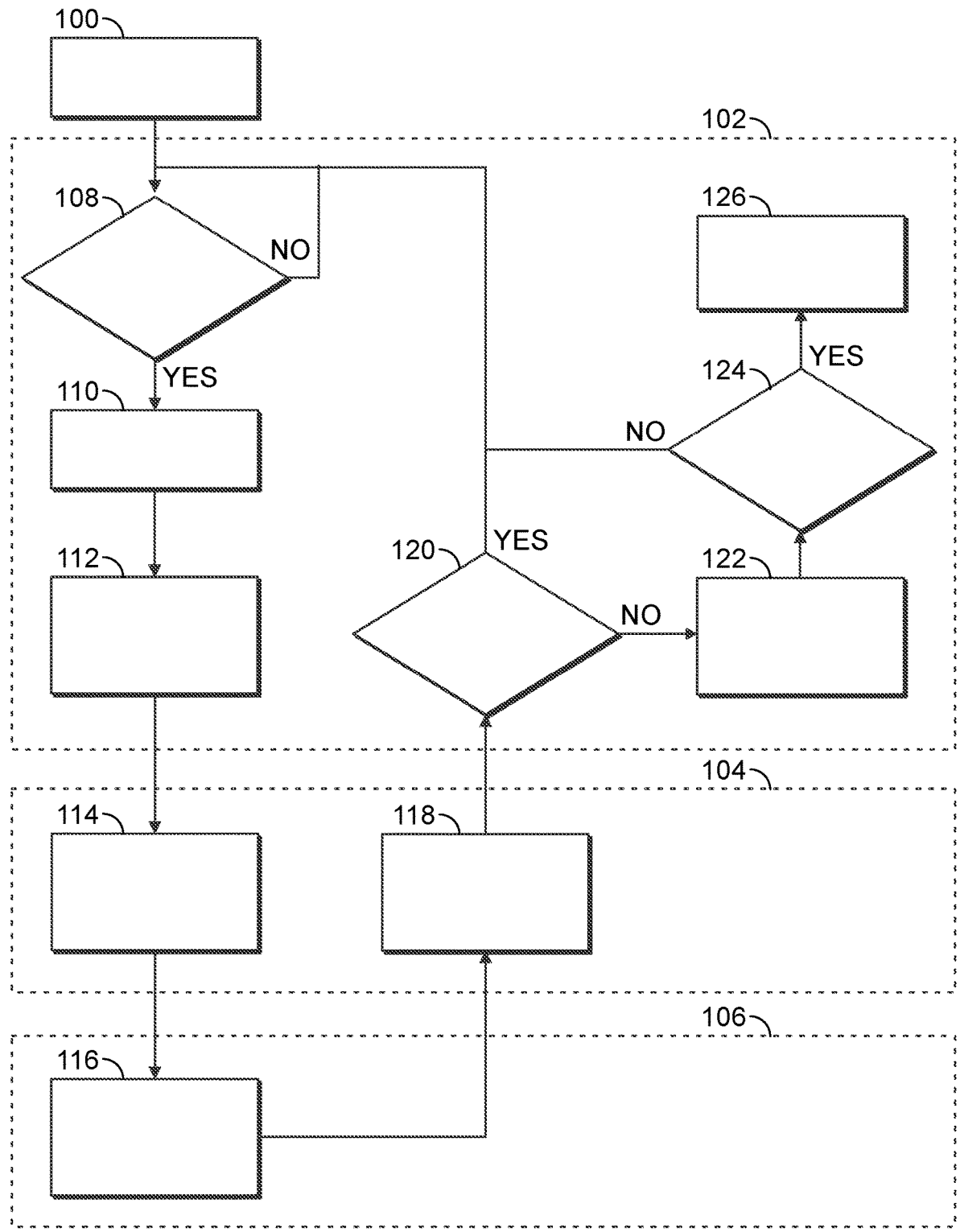
FIG. 4 is a flowchart representation of a method of controlling a vehicle according to an embodiment of the present disclosure.

Referring now to FIG. 4, a method of verifying hardware according to the present disclosure is illustrated in flowchart form. The method begins at block 100, e.g. at the beginning of a drive cycle with the ADS 24 in a nominal mode of operation. The nominal mode refers to an operating mode when no diagnostic conditions, such as undesirable hardware or software behavior, are detected. In the illustrated embodiment the method comprises a first portion 102 performed by the monitor processor 84, a second portion 104 performed by the CPU 80, and a third portion 106 performed by the accelerator 82. However, in other embodiments, aspects of the method may be distributed among a plurality of processors in a different manner as appropriate.

A determination is made of whether a test initiation criterion is satisfied, as illustrated at operation 108. The test criterion generally corresponds to an adequate level of system resources to perform the diagnostic. In an exemplary embodiment, the test initiation criterion may be satisfied in response to the host vehicle transmission being shifted into PARK. However, in other embodiments alternative criteria may be used. As an example, the test criterion may be satisfied in response to a system resource monitor indicating that utilization of the CPU 80 and accelerator 82 is below a threshold. In other alternative embodiments, the processing of the accelerator may be configured such that the test pattern may be passed to the accelerator 82 along with normal data processing. In such embodiments, the test pattern data may be flagged to allow differentiation between the test pattern and live sensor data.

If the determination of operation 108 is negative, i.e. the test initiation criterion is not satisfied, then control remains at operation 108. The algorithm thereby does not proceed unless and until a test initiation criterion is satisfied.

If the determination of operation 108 is positive, i.e. the test initiation criterion is satisfied, then the test is initiated, as illustrated at block 110.

A test pattern identifier is selected and communicated to the CPU 80, as illustrated at block 112. The test pattern identifier may include, for example, one of the reference numbers stored in the first computer-readable storage device 86. In an exemplary embodiment, the test pattern identifier is selected via a random number generator. However, in other embodiments, the test pattern identifier may be selected in other fashions, e.g. in sequential order.

The test request and test pattern identifier is communicated from the CPU 80 to the accelerator 82, as illustrated at block 114.

The accelerator 82 obtains the test pattern corresponding to the test pattern identifier, e.g. via the second computer-readable storage device 88, processes the data in the test pattern, and communicates any resulting object data to the CPU 80, as illustrated at block 116.

The CPU 80 processes the object data, generates a list of objects in the object data, and sends the results to the monitor processor 84, as illustrated at block 118.

The monitor processor evaluates whether the test results satisfy successful test completion criteria, as illustrated at operation 120. This determination may be made at least in part on data stored in the first computer-readable storage device 86. In an exemplary embodiment, the successful test completion criteria comprise detecting an object in the test pattern, classifying the object, identifying correct attributes of the object, and completely processing the test pattern within a predefined time period. Of course, in other embodiments other criteria and/or additional criteria may be used.

If the determination of operation 120 is positive, i.e. the test results satisfy the successful test completion criteria, then control returns to operation 108. The host vehicle thereby continues to operate according to the nominal operating mode so long as the test results indicate that the accelerator 82 and CPU 80 are operating as expected.

If the determination of operation 120 is negative, i.e. the test results do not satisfy the successful test completion criteria, then a diagnostic counter is incremented, as illustrated at block 122. The diagnostic counter indicates a number of diagnostic conditions which have occurred, and may include results from other diagnostic protocols.

A determination is made of whether the diagnostic counter exceeds a predefined threshold, as illustrated at operation 124. The threshold is a positive integer and may be selected according to a number of diagnostic conditions permissible while maintaining a high confidence that the ADS 24 will perform as desired.

If the determination of operation 124 is negative, i.e. the diagnostic counter does not exceed the threshold, then control returns to operation 108. The host vehicle thereby continues to operate according to the nominal operating mode so long as the diagnostic counter does not exceed the threshold.

If the determination of operation 124 is positive, i.e. the diagnostic counter does exceed the threshold, then a degraded operation mode is activated, as illustrated at block 126. In the exemplary embodiment illustrated in FIG. 3, the degraded operation mode may comprise isolating the CPU 80 and accelerator 82 and utilizing a redundant CPU and accelerator, or isolating only the accelerator and utilizing a redundant accelerator. In alternate embodiments, e.g. lower-level autonomous vehicles in which no redundant CPU and/or accelerator are provided, the degraded operating mode may comprise ceasing autonomous control of the host vehicle and returning control to the human operator.

Figure 5:
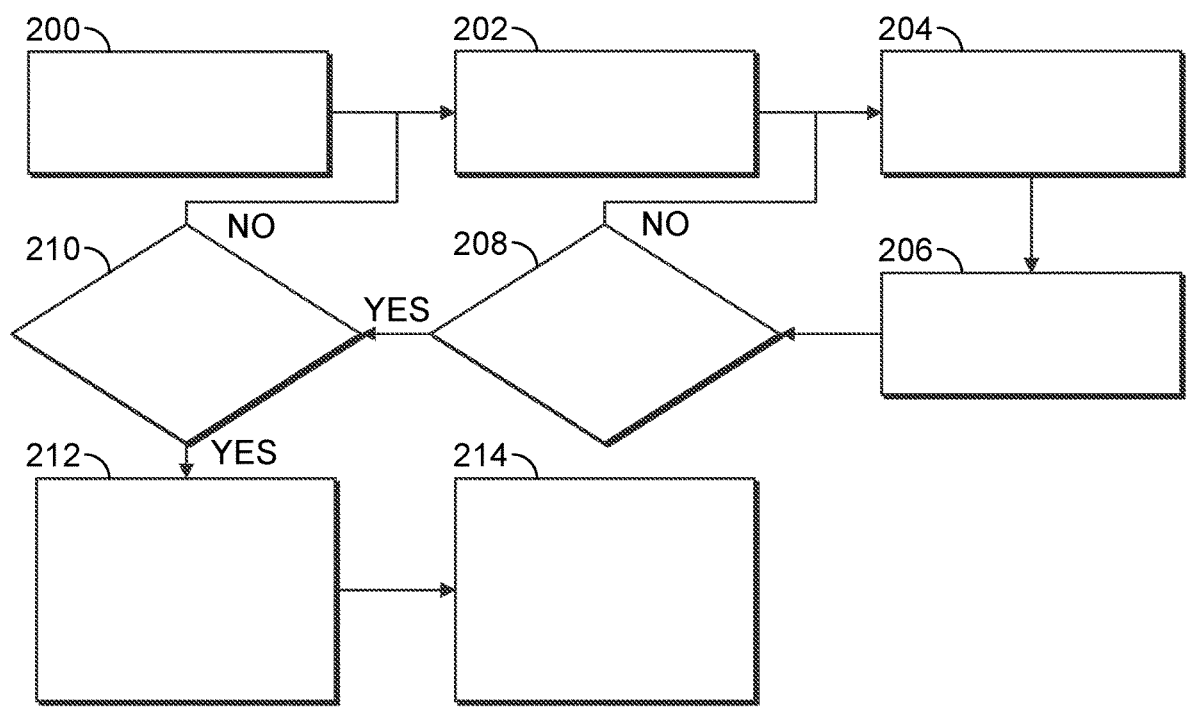
FIG. 5 is a flowchart representation of a method of defining test patterns according to an embodiment of the present disclosure.

Referring now to FIG. 5, a method of defining test patterns according to the present disclosure is illustrated in flowchart form. In an exemplary embodiment, this method may be performed offline, e.g. on reference hardware similar to that described above with respect to FIG. 3, and the test patterns obtained therefrom subsequently deployed to a plurality of host vehicles for hardware validation as discussed above with respect to FIG. 4.

A list of components for evaluation is defined, as illustrated at block 200. In an exemplary embodiment, the components include an accelerator and an associated data memory, e.g. the accelerator 82 and the second computer-readable storage medium 88.

A test pattern with complex characteristics is defined, as illustrated at block 202. In an exemplary embodiment, the test pattern comprises an image frame, video segment, or LiDAR point cloud representative of typical sensor data. The test pattern contains one or more features which may be identified using the components for evaluation.

A number of threads to cover processing across all of the parallel pipelines is determined, as illustrated at block 204. As discussed above, accelerators refer to massively parallel processors, and as such a relatively large number of threads may be required to ensure that all cores are activated.

The test pattern is then processed through the accelerator and other components for evaluation, if any, as illustrated at block 206.

A determination is made of whether an adequate number of cores are utilized and an adequate number of parallel circuits used, as illustrated at operation 208. This determination may be made using a hardware profiler or any other suitable diagnostic tool. In an exemplary embodiment, this determination is satisfied in response to all cores and parallel circuits of the accelerator being utilized. However, in some embodiments, a smaller quantity may be used if appropriate for a given application.

If the determination of operation 208 is negative, then control returns to block 204 and the number of required threads may be re-evaluated.

If the determination of operation 208 is positive, then a determination is made of whether an adequate quantity of memory is used, as illustrated at operation 210. This determination may be made using a hardware profiler or any other suitable diagnostic tool. In an exemplary embodiment, this determination is satisfied in response to all memory of the accelerator being utilized. However, in some embodiments, a smaller quantity may be used if appropriate for a given application.

If the determination of operation 210 is negative, then control returns to block 202 and a new test pattern may be defined. In an exemplary embodiment, the new test pattern is more complex than the previous test pattern and/or comprises a greater quantity of data, e.g. additional image frames.

If the determination of operation 210 is positive, then the test pattern is processed multiple times to calculate an average execution and throughput time, as illustrated at block 212.

The images, expected output, and other validation criteria such as the average execution and throughput time are then stored for use with a target set of hardware components, e.g. deployed in the first computer-readable storage medium 86 and the second computer-readable storage medium 88 of a host vehicle as discussed above.

As may be seen the present disclosure provides a system and method for testing hardware in an automotive vehicle, including massively parallel processors for which known diagnostic methods are unsuitable.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
   at least one sensor configured to detect features in a region proximate an exterior of the vehicle;
   at least one actuator configured to control vehicle steering, propulsion, shifting, or braking;
   an automated driving system selectively operable in a nominal mode and in a degraded mode, the automated driving system being configured to generate an actuator control signal for the at least one actuator in response to sensor signals from the at least one sensor, the automated driving system including a computational accelerator processor; and
   a monitor processor in communication with the automated driving system, the monitor processor being configured to provide a test input for processing by the computational accelerator processor, receive a test output from the computational accelerator processor, and in response to the test output not satisfying a validation criterion, control the automated driving system in the degraded mode.

2. The automotive vehicle of claim 1, wherein the computational accelerator processor comprises a plurality of parallel processing cores, and wherein the test input is configured to utilize a threshold number of the plurality of parallel processing cores.

3. The automotive vehicle of claim 1, wherein the test input comprises an image frame, video segment, or LiDAR point cloud.

4. The automotive vehicle of claim 1, wherein the monitor processor is further configured to provide the test input in response to a resource utilization criterion being satisfied.

5. The automotive vehicle of claim 4, wherein the resource utilization criterion is satisfied in response to the vehicle being shifted into PARK.

6. The automotive vehicle of claim 1, wherein the monitor processor defines a CPU of the automated driving system.

7. The automated vehicle of claim 1, wherein the automated driving system comprises a primary control processor, the primary control processor being distinct from the monitor processor.

8. A method of validating a computational accelerator processor, comprising:
   defining a reference set of components for validation, the reference set of components including a reference computational accelerator processor with a plurality of parallel processing cores;
   defining a test pattern;
   processing the test pattern via the reference set of components to obtain a reference output;
   measuring a number of the plurality of parallel processing cores utilized by the processing the test pattern;
   in response to the number of the plurality of parallel processing cores utilized by the processing the test pattern satisfying a predefined threshold, storing the test pattern and a validation criterion associated with the reference output in non-transient data memory, the non-transient data memory being in communication with a monitor processor, the monitor processor being in communication with a target set of components including a target computational accelerator processor, the target set of components being selectively operable in a nominal mode and in a degraded mode;
   providing the test pattern, via the monitor processor, to the target set of components;
   processing the test pattern via the target set of components to obtain a test output; and
   in response to the test output not satisfying the validation criterion, automatically controlling the target set of components in the degraded mode.

9. The method of claim 8, wherein the target set of components defines at least a portion of an automated driving system of an automotive vehicle.

10. The method of claim 8, wherein the test pattern comprises an image frame, video segment, or LiDAR point cloud.

11. The method of claim 8, wherein the providing the test pattern to the target set of components is in response to a resource utilization criterion being satisfied.

12. The method of claim 11, wherein the target set of components defines at least a portion of an automated driving system of an automotive vehicle, and wherein the resource utilization criterion is satisfied in response to the vehicle being shifted into PARK.

13. The method of claim 8, further comprising, in response to the number of the plurality of parallel processing cores utilized by the processing the test pattern not satisfying the predefined threshold, redefining the test pattern.

14. The method of claim 8, wherein the predefined threshold corresponds to substantially all of the plurality of parallel processing cores.

15. The method of claim 8, wherein the validation criterion includes an execution time or a throughput time.

* * * * *